United States Patent
Fuchs

(10) Patent No.: US 10,423,883 B2
(45) Date of Patent: *Sep. 24, 2019

(54) SYSTEM AND METHOD FOR FAST EVALUATION OF STANDING QUERIES IN CONJUNCTIVE NORMAL FORM

(71) Applicant: salesforce.com, inc., San Francisco, CA (US)

(72) Inventor: Matthew Fuchs, Los Gators, CA (US)

(73) Assignee: salesforce.com, inc., San Francisco, CA (US)

(*) Notice: Subject to any disclaimer, the term of this patent is extended or adjusted under 35 U.S.C. 154(b) by 127 days.

This patent is subject to a terminal disclaimer.

(21) Appl. No.: 14/821,245

(22) Filed: Aug. 7, 2015

(65) Prior Publication Data

US 2015/0347911 A1 Dec. 3, 2015

Related U.S. Application Data

(63) Continuation of application No. 13/744,680, filed on Jan. 18, 2013, now Pat. No. 9,135,556.

(60) Provisional application No. 61/608,420, filed on Mar. 8, 2012.

(51) Int. Cl.
*G06N 5/04* (2006.01)
*G06N 5/02* (2006.01)
*G06Q 10/00* (2012.01)

(52) U.S. Cl.
CPC .............. *G06N 5/046* (2013.01); *G06N 5/02* (2013.01); *G06Q 10/00* (2013.01); *G06N 5/04* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

Hinrichs, Practical Declarative Network Management, WREN'09, 2009, pp. 1-10.*

(Continued)

*Primary Examiner* — Wilbert L Starks
(74) *Attorney, Agent, or Firm* — Lorenz & Kopf, LLP

(57) ABSTRACT

Methods and systems are provided for evaluating standing queries against updated contact entries configured as a stream of facts. The method includes resolving the standing queries into an array of rules, each rule having a first and a second condition; sorting one of the facts into a first property and a second property; comparing the first property of the fact to the first condition of each rule in the array of rules to produce a first subset of matching rules; comparing the second property of the fact to the second condition of each rule in the first subset of rules to produce a second subset of matching rules; and reporting at least one of the second subset of rules to an author of the matching rule. The method further includes populating a first hash with indicia of the first subset, and populating a second hash with the second subset.

14 Claims, 6 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,135,556 B2 * | 9/2015 | Fuchs .................... G06Q 10/00 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

OTHER PUBLICATIONS

Harriehausen-Muehlbauer, Mobile Processing of Business Cards, The 17th International Conference on Information Systems Analysis and Synthesis: ISAS 2011, 2011, pp. 1-6.*

Bansal, et al., Commutativity Condition Refinement, 2015, pp. 1-14.*

(56) References Cited

OTHER PUBLICATIONS

Jabbour, et al., Revisiting the Learned Clauses Database Reduction Strategies, arXiv.org, pp. 1-13.*

Bansal, et al., Connnnutativity Condition Refinement, 2015, pp. 1-14 (Year: 2015).*

USPTO, Non-final Office Action issued in U.S. Appl. No. 13/744,680, dated Oct. 30. 2014.

USPTO, Notice of Allowance issued in U.S. Appl. No. 13/744,680, dated May 13, 2015.

Abiteboul, S., et al., "Foundations of Databases," Addison-Wesley Publishing Company, 1995, pp. 1-702.

Oard, D.W., et al., "User-Assisted Query Translation for Interactive Cross-language Information Retrieval," University of MD, College Park, 2006, pp. 1-31.

* cited by examiner

| | CONDITION I | CONDITION II | CONDITION III | CONDITION IV |
|---|---|---|---|---|
| RULE 1 | ROCKFORD | DATA.COM | | DOE |
| RULE 2 | ROCKFORD | IBM | | DOE |
| RULE 3 | SAN MATEO | DATA.COM | | DOE |
| RULE 4 | SAN MATEO | IBM | | DOE |
| RULE 5 | SAN MATEO | DATA.COM | | DOE |
| ... | | | | |
| RULE N | | | | |

SYSTEM AND METHOD FOR FAST EVALUATION OF STANDING QUERIES IN CONJUNCTIVE NORMAL FORM

CROSS-REFERENCE TO RELATED APPLICATIONS

This application is a continuation of U.S. patent application Ser. No. 13/744,680, filed Jan. 18, 2013, which claims the benefit of U.S. provisional patent application Ser. No. 61/608,420, filed Mar. 8, 2012, the entire content of which is incorporated by reference herein.

TECHNICAL FIELD

Embodiments of the subject matter described herein relate generally to computer systems and applications for evaluating standing queries and, more particularly, to a method for fast evaluation of event streams in conjunctive normal form.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Robust customer relationship management (CRM) systems and applications for managing contacts have been developed for use in the multi-tenant environment. Consequently, maintaining business and professional contact information has migrated from the Rolodex™ to the cloud. Commercial databases currently maintain millions—or even tens of millions—of business, professional, technical, and social contact entries. In a typical contact database environment, subscribers interrogate the database through structured searches using, for example, structured query language (SQL) formatted queries. Even though a relatively small amount of the contact data changes on a daily basis, for example, on the order of one to three percent, continuously or periodically processing a large number of standing queries on the changed data requires significant computing resources.

Systems and methods are thus needed for processing standing queries, also referred to as event streams, efficiently to conserve computational resources, to thereby keep pace with the need for real time or near real time searching of continuously updated contact data.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for evaluating standing queries against updated contact entries configured as a stream of facts. The method includes resolving the standing queries into a set of rules, each rule having a sequence of conditions; placing the rules into sets based on their first condition into a hash table and then subdividing each of those sets based on their second condition and storing those sets in hash tables; sorting one of the facts into a first property and a second property; comparing the first property of the fact to the first hash table to produce a first subset of matching rules; comparing the second property of the fact to the second hash table to produce a second subset of matching rules; and reporting at least one of the second subset of rules to an author of the matching rule.

In one embodiment, the application comprises computer code stored on or embodied in a computer readable medium such as a hard drive, removable drive, or network server, and the system includes an interactive user interface displayed on a computer monitor.

Figure 1:
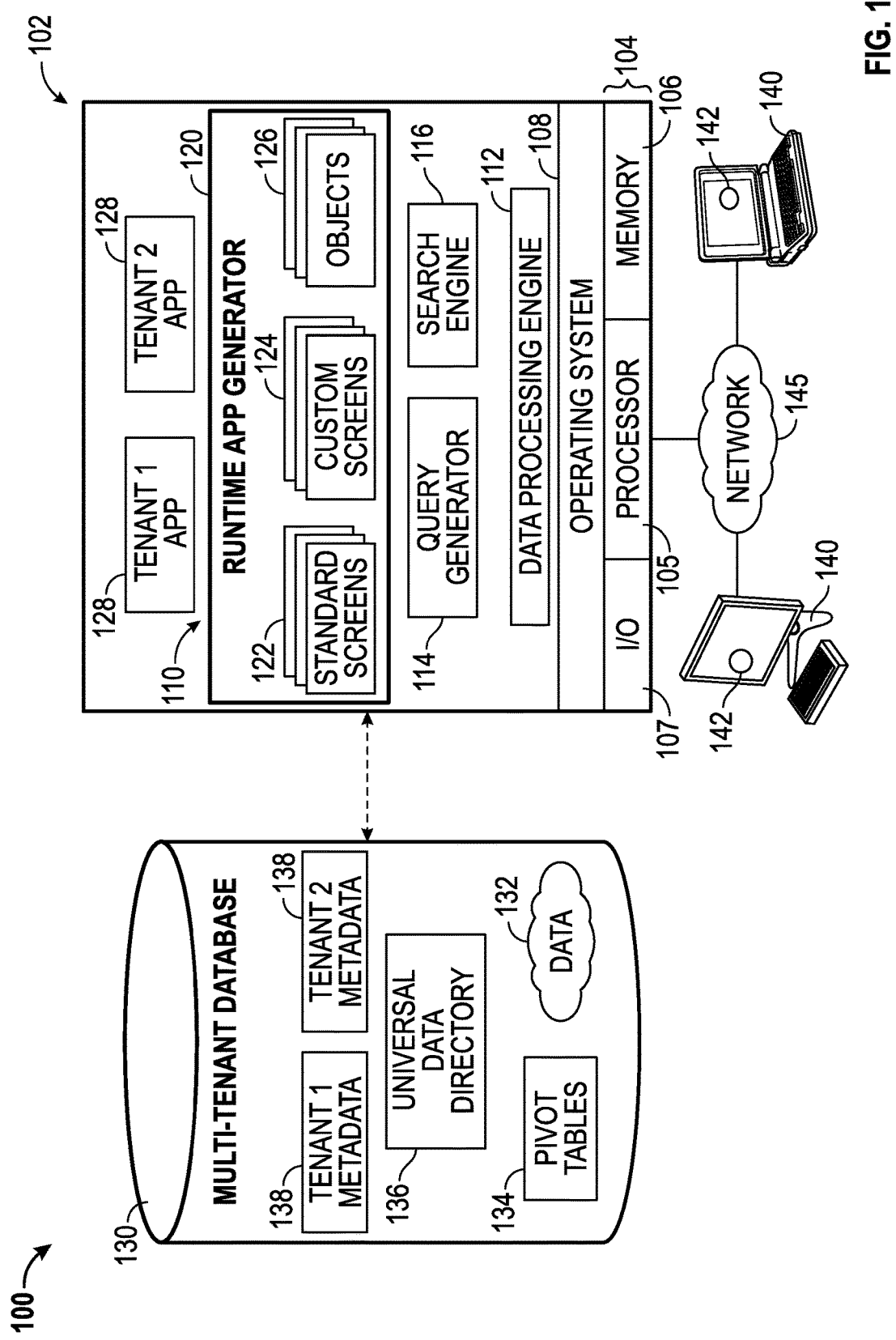
FIG. 1 is a schematic block diagram of a multi-tenant computing environment in accordance with an embodiment.

Turning now to FIG. 1, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In accordance with one embodiment, application 128 may be an online search engine for interrogating a database of contact information. In an embodiment, a contact database contains up to millions—or tens of millions—of contact entries, referred to herein as "facts". One fact may include several properties, such as an individual's last name, first name, title, city, country, company (e.g., employer), and the like. Thus, an exemplary fact may have the following properties: Doe; John; Vice President—Engineering; San Mateo; U.S.A.; Data.com.

Commercial contact databases may charge a per-use or a monthly (or other periodic) subscription fee to access or search the database. Alternatively, individuals can trade their private rolodex entries in exchange for access to the commercial database without paying a fee, a technique known as crowdsourcing.

Searches range from simple, straightforward inquiries to complex, structured query language (SQL) formatted standing queries. For example, a simple search may look for a particular person named "John Doe" who works for "Data.com" in "San Mateo" in the "U.S.A.". A more complex, structured standing query may be configured to continuously interrogate the database, and periodically report back results for all "Vice Presidents" of "Engineering" who work for either "Data.com" or "IBM" in either "Rockford", "San Mateo", or "Santa Cruz".

Because the information within the database changes from time to time, it is often desirable to maintain a set of standing queries—or "Rules"—which may be run against the then current information in the database on a periodic basis, to provide real time or near real time search results as the underlying contact data is updated. To reduce computational and processing resources, it is desirable to apply the set of Rules to only that data which has changed since the previous search (or to new data as it arrives in real time), and thereby avoid having to re-search that portion of the data which has not been altered since the previous search. In this context, the revised, updated, or changed data ("facts") are referred to as the "event stream". In an embodiment, only the event stream (as opposed to the entirety of the underlying static contact information forming the database) is applied to the standing Rules and, if a fact within the event stream matches a Rule, the corresponding Rule "fires", triggering an updated search result for the fired Rule.

Figure 2:
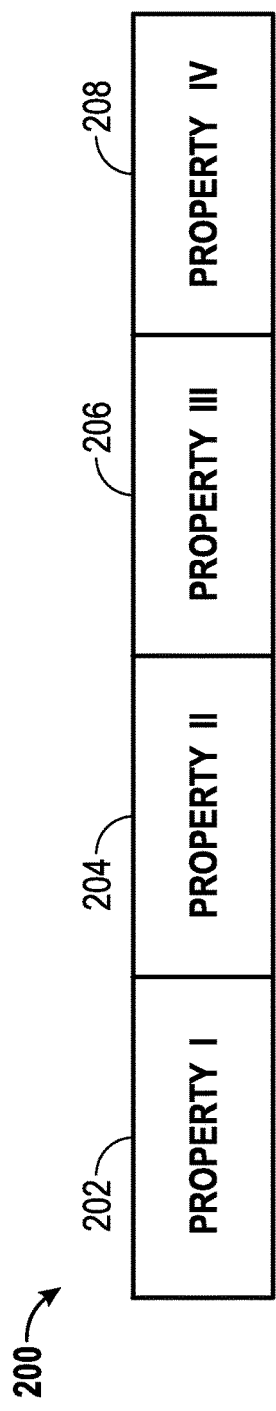
FIG. 2 is a schematic block diagram of a fact portion of an event stream in accordance with an embodiment.

Referring now to FIG. 2, an exemplary fact 200 includes a plurality of properties, for example, a first property (Property I) 202, a second property (Property II) 204, a third property (Property III) 206, and a fourth property (Property IV) 208. Alternatively, each fact 200 may include a greater or lesser number of properties. In the illustrated embodiment, each property comprising a fact must be defined to constitute a valid fact, although other implementations are possible and contemplated by this disclosure.

In an embodiment, first property 202 corresponds to a city field (e.g., Rockford, San Mateo, or the like), second property 204 corresponds to a company, institution, or organization field (e.g., Data.com, IBM, Marquette University, etc.), third property 206 corresponds to a country field (e.g., U.S.A., Canada, etc.), and fourth property 208 corresponds to a person's last name (e.g., Doe, Holtzman, etc.).

Figure 3:
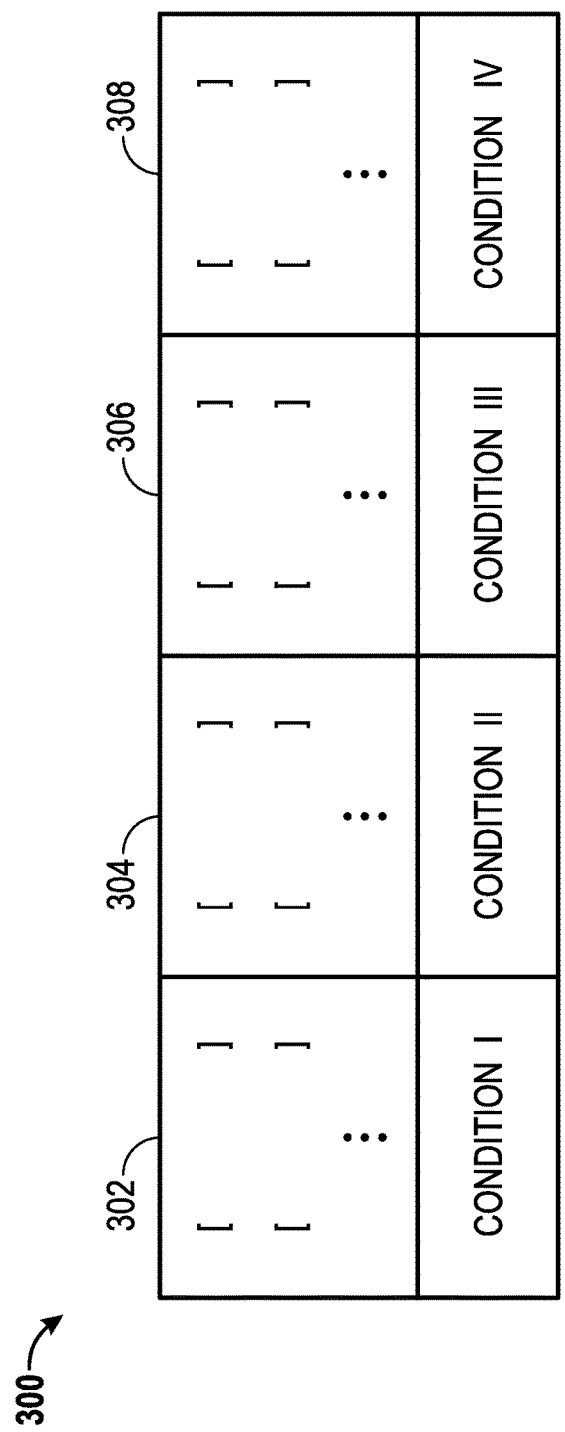
FIG. 3 is a schematic block diagram of a structured query in accordance with an embodiment.

Referring now to FIG. 3, an exemplary Rule 300 includes a plurality of conditions, for example, a first condition (Condition I) 302, a second condition (Condition II), a third condition (Condition III), and a fourth condition (Condition IV). As briefly discussed above, each Rule 300 represents a standing query. At any given point in time, a plurality of standing queries are compiled into data structures stored in two levels of hash table, and compared against a series of facts (the event stream); if every condition in a Rule 300 "matches" a corresponding property in a fact 200, the Rule is satisfied ("fires") for that fact, and that fact is identified as being responsive to the query represented by the Rule. In this context, however, it should be noted that if a particular condition is not specified (i.e., it is left blank), then that unspecified condition "matches" its associated property for all facts. That is, not specifying a particular condition is analogous to a condition matching all possible values for a corresponding property.

By way of non-limiting example and as discussed in greater detail below, a standing query (Rule) configured to search for vice presidents of engineering who work for either for Data.com or IBM in San Mateo would not specify the condition corresponding to "last name", thereby returning all last names satisfying the foregoing criteria. Moreover, each rule, being a search query, may have up to or including (but not more than) N conditions, where N is an in integer representing the number of properties in each valid fact.

With continued reference to FIG. 3, each query may advantageously be expressed in conjunctive normal form (CNF) which, in Boolean logic, refers to a conjunction of clauses where each clause is itself a disjunction of literals, such as the expression: [A OR B] AND [D OR E OR F] AND [G]. Thus, condition 302 may implement the city parameter "either Rockford or San Mateo", condition 304 may implement the employer parameter "either Data.com or IBM", and so on.

Figure 4:
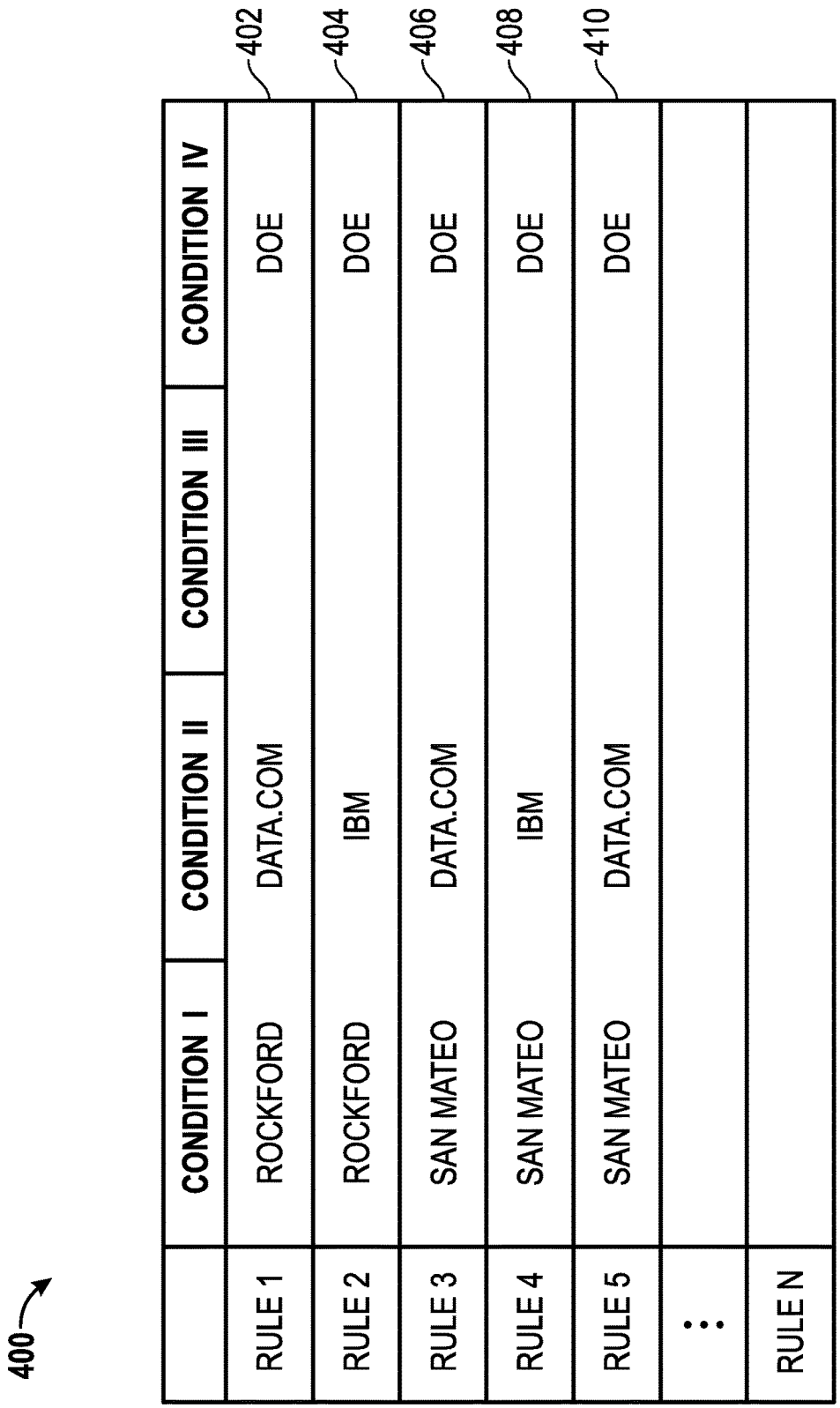
FIG. 4 is a schematic block diagram of a rules database in accordance with an embodiment.

FIG. 4 is an exemplary database (or data array) table 400 which includes a plurality of Rules 402-410 in tabular form. More particularly, a first rule 402 (Rule 1) includes Condition I=Rockford; Condition II=Data.com; Condition III= [null]; and Condition IV=Doe. A second rule 404 (Rule 2) is similar to rule 402, except that Condition II=IBM.

Figure 5:
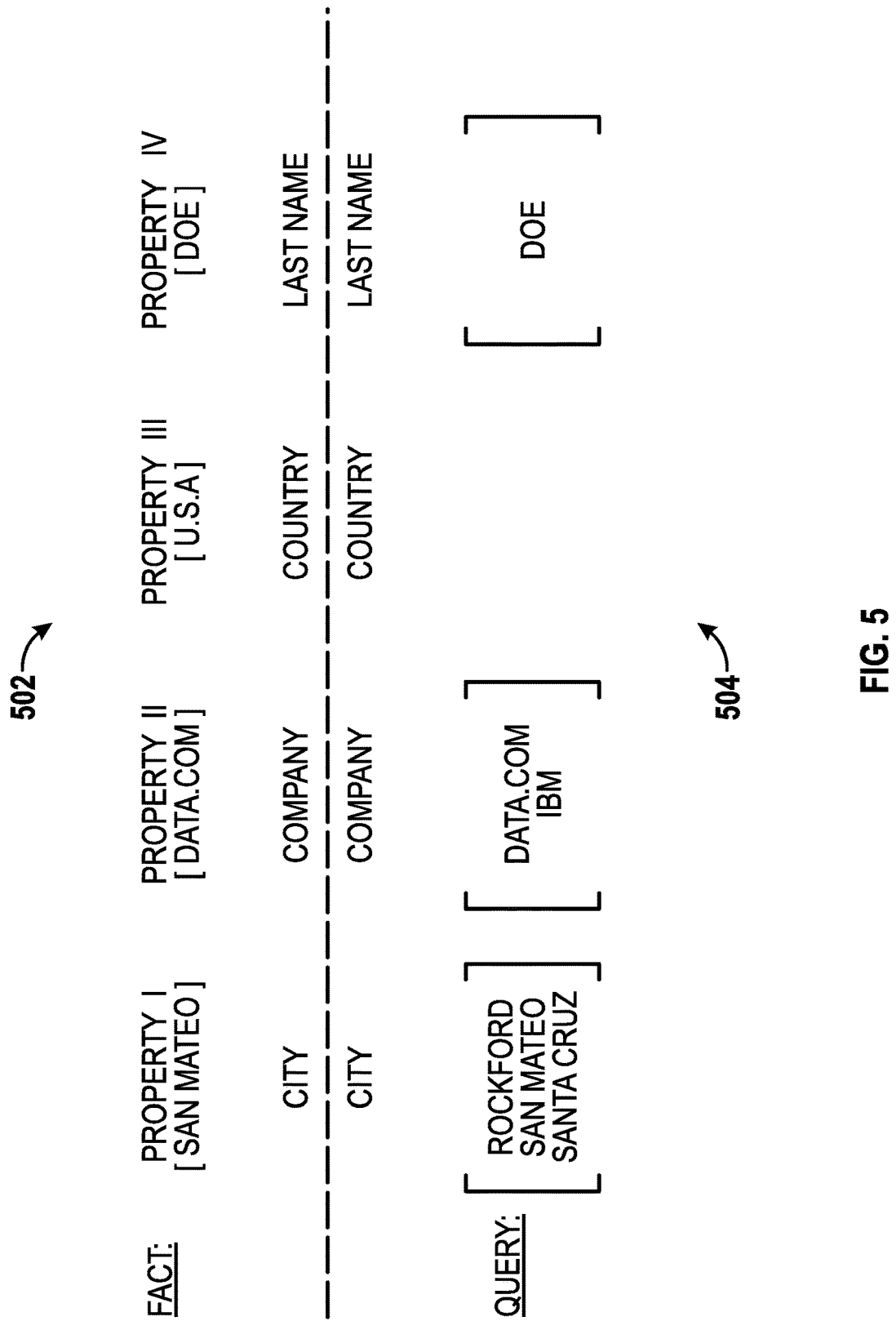
FIG. 5 is a conceptual diagram illustrating a fact applied to a structured query in accordance with an embodiment.

FIG. 5 is a conceptual representation of a single fact 502 being applied to a single query 504, it being understood that fact 502 represents a discrete segment of an event stream, and query 504 represents one or more rules from hash table 400. More particularly, fact 502 represents an incremental quantum of contact data which has been newly entered into the system or otherwise updated and, hence, constitutes part of the event stream with respect to which the hash table of standing queries are continuously (or periodically) applied in accordance with the present disclosure.

More particularly, fact 502 includes four (4) properties, and query 504 defines three (3) conditions expressed in conjunctive normal form. Specifically fact 502 defines Property I (city=San Mateo); Property II (company=Data.com); Property III (country=USA); and Property IV (last name=Doe). Query 504 defines a first condition (city=Rockford or San Mateo or Santa Cruz); a second condition (company=Data.com or IBM); a third condition (country=[null]); and a fourth condition (last name=Doe).

Figure 6:
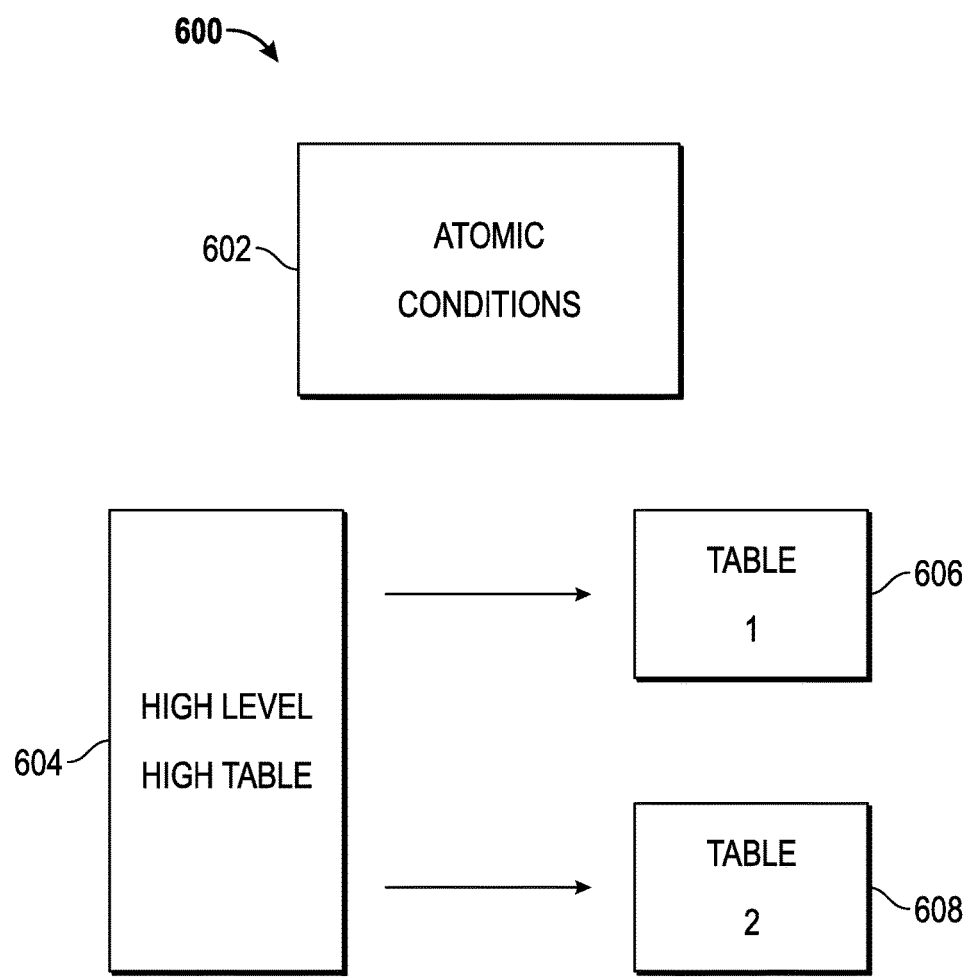
FIG. 6 is a conceptual block diagram illustrating a data array table and associated hash tables in accordance with an embodiment.

FIG. 6 is a conceptual block diagram 600 of a technique for fast evaluation of standing queries using a list of atomic conditions 602, a first level hash table 604, respective second level hash tables 606 and 608, and the following queries:

504: (City=Rockford or San Mateo or Santa Cruz), (Company=Data.com or IBM), LastName=Doe
   505: City=San Mateo, LastName=Doe
   506: (Company=Data.com or IBM), LastName=Doe
   507: City=San Mateo, Company=IBM The foregoing queries contain a total of six atomic conditions, namely:

1) City=Rockford
   2) City=San Mateo
   3) City=Santa Cruz
   4) Company=Data.com
   5) Company=IBM
   6) LastName=Doe The first level hash table 604 contains all the conditions that are first conditions for a rule; in this example, first level hash table 604 contains a total of five (5) entries, corresponding to the five City and Company conditions (but not the LastName condition). In accordance with various embodiments, hash tables may be implemented using the format {key1=>value1, key2=>value2}. We can represent the two levels from these rules in first hash table 604 as follows:

{City: SantaCruz=>{Company:Data.com=>504, Company:IBM=>504},
   City:Rockford=>{Company:Data.com=>504, Company=IBM=>504},
   City: SanMateo=>Company:Data.com=>504, Company:IBM=>(504,507),LastName:Doe=>505},
   Company:Data.com=>{LastName:Doe=>506},
   Company:IBM=>{LastName:Doe=>506}}

Each property at the first level gets another hash table for the second level. The process then takes all the properties of the fact under inspection and applies them to the hash table in sequence. In particular, Property 1 (City=SanMateo) returns second level hash table 606 from table 604 as follows: {Company:Data.com=>504, Company:IBM=>(504, 507), LastName:Doe=>505}. In similar fashion, Property 2 (Company=Data.com) returns {LstName=Doe=>506} from table 604, and returns rule (504) from hash table 606, and Property 3 (Country=USA) is not present in any hash table or in rule 504. Property 4 (LastName=Doe) matches nothing from table 604; Property 4 (LastName=Doe) matches rule (505) from table 606; Property 4 (LastName=Doe) matches rule (506) from table 608; and Property 4 (LastName=Doe) matches the third condition in rule 504.

Accordingly, since there are only four (4) properties, it is determined that the fact under inspection matches rules 504, 505, and 506. In this regard, having looked at two levels of hash table, the number of matching rules will be very small and they can often simply be tested by looking at all the conditions in each rule.

More abstractly, facts may compared to (applied to) queries or rules in the following manner. As an initial matter, and as stated above, a query structured in conjunctive normal form is characterized by a conjunction of clauses, each clause being a disjunction of literals. In the simplest case where each clause includes only a single literal, the query may be expressed as a single rule, such as the query (rule): (city=San Mateo)+(company=Data.com)+(country=USA)+(name=Doe). In the more general case where one or more clauses within the query include more than one literal, the query may be resolved into a plurality of simpler rules wherein each clause comprises one (and only one) literal. For example, the complex query (A or B)+(D) may be broken down into (i.e., equivalently expressed as) two rules where each clause defines a single condition, as follows:

$(A)+(D)$  Rule 1

$(B)+(D)$.  Rule 2

Figure 7:
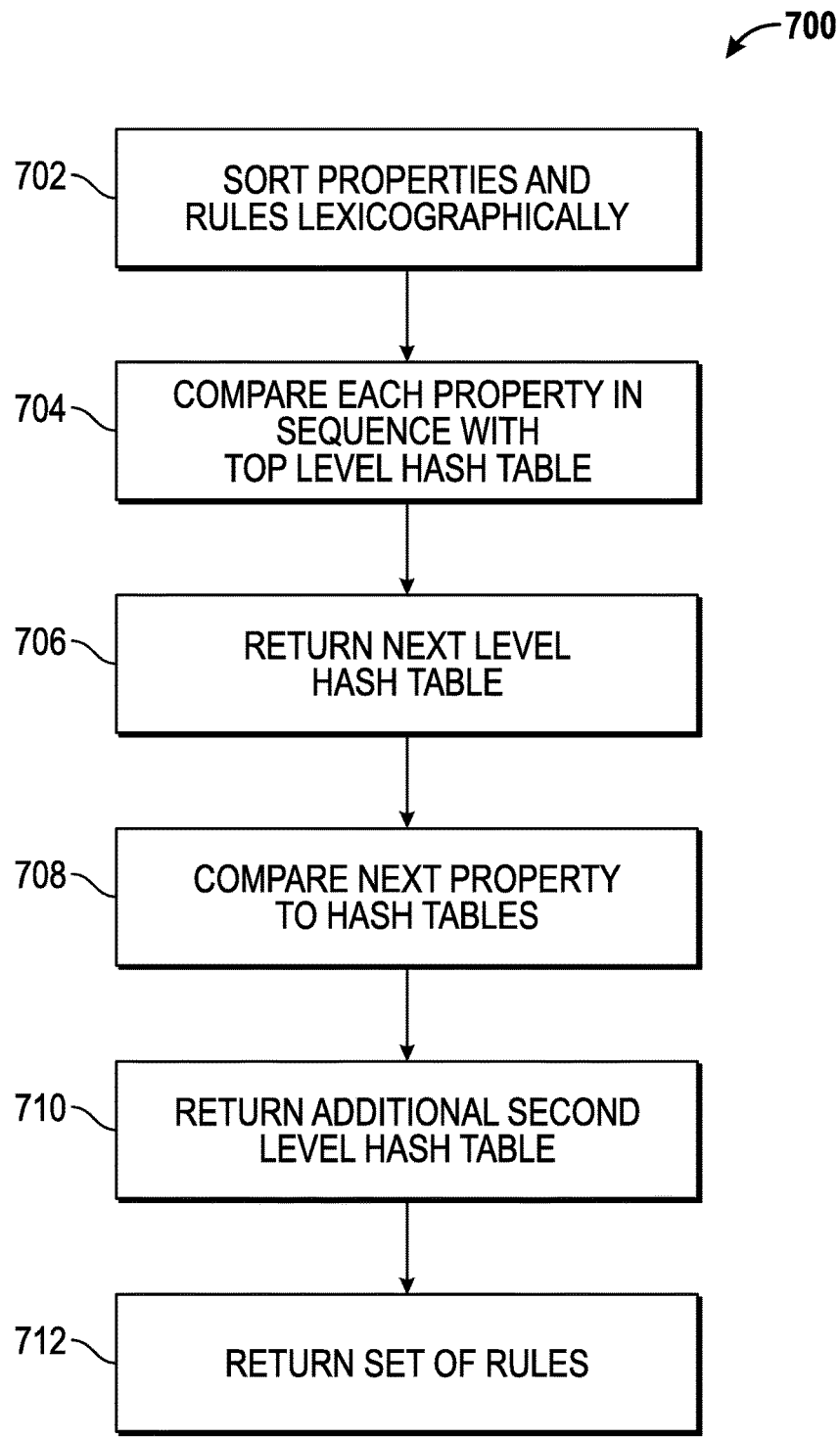
FIG. 7 is a flow chart illustrating a method for comparing a fact to a rules database in accordance with an embodiment.

FIG. 7 is a flow chart illustrating a method 700 for comparing (applying) an event stream to a set of standing queries using a variation of the well known RETE algorithm designed by Dr. Charles L. Forgy of Carnegie Mellon University and the basis for many popular rule engines and expert system shells. See also, for example, the Radian6™ system available from the SalesForce Corporation at wwww-.salesforce.com or the Drools Business Logic Integration Platform available from the JBoss Community at www.j-boss.org. These methods typically match rules against facts in a systematic manner.

More particularly, method 700 involves sorting (task 702) the properties and rules in a logical order. In an embodiment, the properties and rules are sorted lexicographically; that is, they are sorted in alphabetical order, from A to Z. For example, for facts which include the properties "first name", "last name", and "zip code", these properties would be sorted in the following lexicographic order:

1) First Name
2) Last Name
3) Zip Code

That is, the letter "F" comes before the letter "L", and the letter "L" comes before the letter "Z", in the English alphabet. In addition, for each rule in the hash table, the corresponding conditions are sorted (Task 702) in the same logical order in which the fact properties are sorted, e.g., lexicographically. In this way, each fact in the event stream, and each rule in the hash table, is expressed as a tuple, i.e., an ordered data structure having an identically specified number and sequence of elements.

Generally, all facts have the same sequence of properties, such as the five property format: (a,b,c,d,e). Rules, however, may have either the same number or a fewer number of corresponding conditions. For example, consider a first level hash table which contains the following rules:

1) (a, c, d)
2) (a, b, d)
3) (a, b, e)
4) (b, c, e)
5) (b, d, e)
6) (a)
7) (d)

When a fact arrives, such as (a,b,c,d), method 700 compares (task 704) each property in sequence to the rules in the first level hash table. The above first level table includes: four entries having a first property "a", namely, rules 1, 2, 3, and 6; two entries having a first property "b", namely, rules 4 and 5; and one entry having the first property "d, namely, rule 7. Thus, for property "a", method 700 returns (task 706) a second level hash table which includes those rules whose first property started with "a", as well as the singleton rule having just "a" (because it has no other properties to search on). Method 700 then looks (task 708) at both hash tables with the next property "b". More particularly, the first level hash table includes a match for rule 4 (b,c,e) and rule 5 (b,d,e) because the first property is "b" in each of these rules. Because more than one rule is returned, the rules are returned in the form of another second level hash table (task 710). Looking to the initial second level hash table with property "b" returns rule 2 (a,b,d) and rule 3 (a,b,e) because their second properties correspond to "b". Because rules 2 and 3 were returned from a second level hash table in this example, they are returned (task 712) in the form of a list or set of rules, as opposed to another hash table. It should be noted that the number of hash tables will not exceed the number of properties, and that more than two levels of hash tables may be used. When no further searching of the rules is necessary or desired, the results may be reported.

More particularly, when reporting the results of method 700, the final subset of rules represent those standing queries for which the fact under inspection have been fired. Consequently, the corresponding fact is reported as a search result for the event stream containing the fact under inspection. This reporting can be on a "push" basis (e.g., a text message or other notification may be sent to the author of the standing query) or, alternatively, the report may be "pulled" from the system by the author, for example by logging into an account which preserves the search results.

A method is thus provided for evaluating standing queries in conjunctive normal form, including resolving the standing queries into an array of rules, each rule comprising a plurality of conditions; sorting, for each rule, the conditions into a logical order; identifying a fact having a plurality of properties sorted in a logical order; evaluating the sorted fact against each sorted rule in the array; and identifying a subset of the array of rules which match the fact, wherein the logical order is lexicographical.

In an embodiment, the step of resolving involves reducing at least one clause in a query from a disjunction of literals to a single literal.

In a further embodiment the fact comprises N properties and each rule comprises up to N conditions, where N is an integer, and wherein the conditions and the properties include at least two of: city; last name; first name; country; company; zip code; and title.

In another embodiment the step of identifying involves selecting a fact from a database of contact entries; selecting involves selecting a contact entry that has been changed and incorporating or integrating the fact into an event stream.

In a further embodiment, the step of evaluating involves comparing the fact to each rule using hash tables. In addition, a first property may be used as a key into a hash table to return a first set of rules, and a second property associated with the fact may be used as a key into a hash table to return a second set of rules. In particular, a high level hash table may be used to represent first evaluation results, and at least one secondary hash table may be used to represent subsequent evaluation results.

A further embodiment involves reporting the subset of rules which match the fact, wherein reporting may include notifying an author of one of the rules in the subset and/or posting at least one of the rules of the subset on a website accessible by an author of the posted rule.

In a further embodiment the step of evaluating is performed by a server in a multitenant computing environment.

In a multitenant computing environment of the type including a database of contact entries, a method of evaluating standing queries against updated contact entries configured as a stream of facts includes the steps of: resolving the standing queries into an array of rules, each rule comprising a first and a second condition; sorting at least one of the facts into a first property and a second property; sorting, for each rule, the conditions into a logical order; evaluating the sorted fact against each sorted rule; identifying a subset of the set of rules which match the fact; and reporting at least one of the second subset of rules to an author.

In one embodiment the method further includes populating a first hash with indicia of the first subset, and populating a second hash with indicia of the second subset.

A computer application embodied in a non-transitory medium is provided for operation by a computer processor for performing the steps of: resolving a plurality of standing queries into an array of rules, each rule comprising a plurality of conditions; sorting, for each rule, the conditions in a logical order; identifying a fact having a plurality of properties sorted in a logical order; evaluating a first property of the sorted fact against a first condition of each sorted rule in the array and identifying a first subset of the array of rules which match the fact; and evaluating a second property of the sorted fact against a second condition of each rule in the first subset to identifying a second subset of rules.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer-implemented method of evaluating computer database queries, the method comprising:
    resolving by a data processor the queries of business contact entries in a database into a set of rules, each rule comprising conditions;
    sorting by the data processor, for each rule, the conditions into a logical order;
    identifying by the data processor a fact having a plurality of properties sorted in the logical order, wherein the identifying includes selecting the fact from the database of the business contact entries that represent user data of the business contact entries;
    evaluating by the data processor the fact against each rule, wherein the evaluating comprises comparing the fact to each rule using hash tables, and further comprises using a second property associated with the fact as a key into a hash table to return a second set of rules; and
    identifying by the data processor a subset of the set of rules which match the fact.

2. The method of claim 1, wherein the database queries are standing queries in conjunctive normal form.

3. The method of claim 1, wherein the logical order is lexicographical.

4. The method of claim 1, wherein the resolving comprises reducing at least one clause in a query from a disjunction of literals to a single literal.

5. The method of claim 1, wherein the fact comprises N properties and each rule comprises up to N conditions, where N is an integer.

6. The method of claim 1, wherein the conditions and the properties include at least two of: city; last name; first name; country; company; zip code; and title.

7. The method of claim 1, wherein a first property is used as a key into a first hash table to return a first set of rules.

8. The method of claim 1, wherein the evaluating comprises creating a high level hash table representing first evaluation results.

9. The method of claim 8, wherein the evaluating comprises creating at least one secondary hash table representing second evaluation results.

10. A computer-implemented method of evaluating computer database queries, the method comprising:
    resolving by a data processor the queries of business contact entries in a database into rules, each rule comprising conditions;
    sorting by the data processor, for each rule, the conditions into a logical order;
    identifying by the data processor a fact having a plurality of properties sorted in the logical order, wherein the identifying includes selecting the fact from the database of the business contact entries that represent user data of the business contact entries, wherein the evaluating comprises comparing the fact to each rule using hash tables;
    evaluating by the data processor the fact against each rule;
    identifying by the data processor a subset of the rules which match the fact; and
    reporting by the data processor the identified subset.

11. The method of claim 10, wherein the database queries are standing queries in conjunctive normal form.

12. The method of claim 10, wherein the reporting comprises notifying an author of one of the rules in the subset.

13. The method of claim 10, wherein the reporting comprises posting at least one of the rules of the subset on a website accessible by an author of the posted rule.

14. A computer-implemented method of evaluating computer database queries in conjunctive normal form against a fact having properties sorted in a logical order, the queries comprising a plurality of conditions sorted into a logical order, the method comprising:
    comparing by a data processor a first property of the fact to queries of business contact entries in a database in a first level table;
    returning by the data processor a second level table of queries, based on the comparing;
    comparing by the data processor a second property of the fact to queries of the business contact entries in the database in both the first level table and the second level table;
    identifying by the data processor a subset of the queries that match the fact; and
    reporting by the data processor the subset.

* * * * *